Jan. 16, 1962 J. J. LYNOTT 3,016,612

RECORDING DEVICE

Filed April 17, 1958 3 Sheets-Sheet 1

INVENTOR.
JOHN J. LYNOTT

BY John B. Sponsler

Jan. 16, 1962 J. J. LYNOTT 3,016,612

RECORDING DEVICE

Filed April 17, 1958 3 Sheets-Sheet 3

United States Patent Office 3,016,612

Patented Jan. 16, 1962

3,016,612

RECORDING DEVICE

John J. Lynott, Los Gatos, Calif., assignor to International Business Machines Corporation, New York, N.Y., a corporation of New York Filed Apr. 17, 1958, Ser. No. 729,110
19 Claims. (Cl. 33—32)

This invention relates to a recording device and more particularly to a recording device for plotting and connecting discrete points on a chart or plotting sheet.

In plotters operating from orthogonal input instructions, such as latitude and longitude, which plot and connect a series of points on a chart using straight lines, it is usual to first convert the orthogonal input instructions to polar coordinates. This information is then normally fed to a suitable servomechanism which drives a stylus assembly to each succeeding new location, defined by its vectorial angle $\theta$ and its radius vector R. Since the orthogonal inputs must first be converted in such plotters to polar coordinates, additional mechanism is necessary in such plotters in order to perform this function, as well as the required servomechanism.

According to this invention, there is provided a stylus assembly which is slidably mounted on an arm pivotally supported by an orthogonally positionable crosshead member. The normal position of the stylus is directly beneath the center of the crosshead member. Means are provided for temporarily holding the stylus to a plotting surface while the crosshead is being positioned to each new location on the plotting surface. Moving the crosshead causes the arm to pivot in the direction of the new location and also causes the arm to slide with respect to the anchored stylus since the arm is carried with the crosshead as it moves. Releasing the holding means effects a return of the stylus to its normal position beneath the crosshead member since a coil spring is coupled to both the stylus assembly and the arm. As the stylus assembly returns to its normal position, it draws a line on the surface. Thus, there has been provided an extremely simplified plotting device which eliminates both the need for converting orthogonal inputs to polar coordinates, as well as eliminating the necessity of employing the usual servomechanism responsive thereto.

It is, therefore, an object of this invention to provide a simplified plotter directly responsive to orthogonal input instructions.

It is another object of this invention to provide a plotter having a simplified means for driving a stylus to each subsequent plotted point.

In prior art plotters, as described above, it has been desirable to supply the computed length of each radius vector R (as generated by the means which converts the Cartesian coordinates to polar coordinates) to associated computing apparatus. For example, the total length of a line connecting a series of points has been determined by accumulating all the separate distances between adjacent points, i.e., by accumulating all the radius vectors. This feature is retained and simplified in the present invention, wherein a variable resistor is bonded to the pivoted arm and a wiper is secured to the stylus assembly so that the value of resistance increases as the stylus moves away from its normal position beneath the center of the crosshead. In this manner, an analog measurement of each radius vector R is automatically generated each time the crosshead moves to a new location.

It is another object of this invention, therefore, to provide a plotter having a simple means of computing the distance between adjacent plotted points.

Other objects of the invention will be pointed out in the following description and claims and illustrated in the accompanying drawings which disclose, by way of example, the principle of the invention and the best mode which has been contemplated of applying that principle.

FIGS. *5a*, *5b* and *5c* are schematic views showing the sequence of operations in plotting a point defined by Cartesian coordinates.

Figure 6:
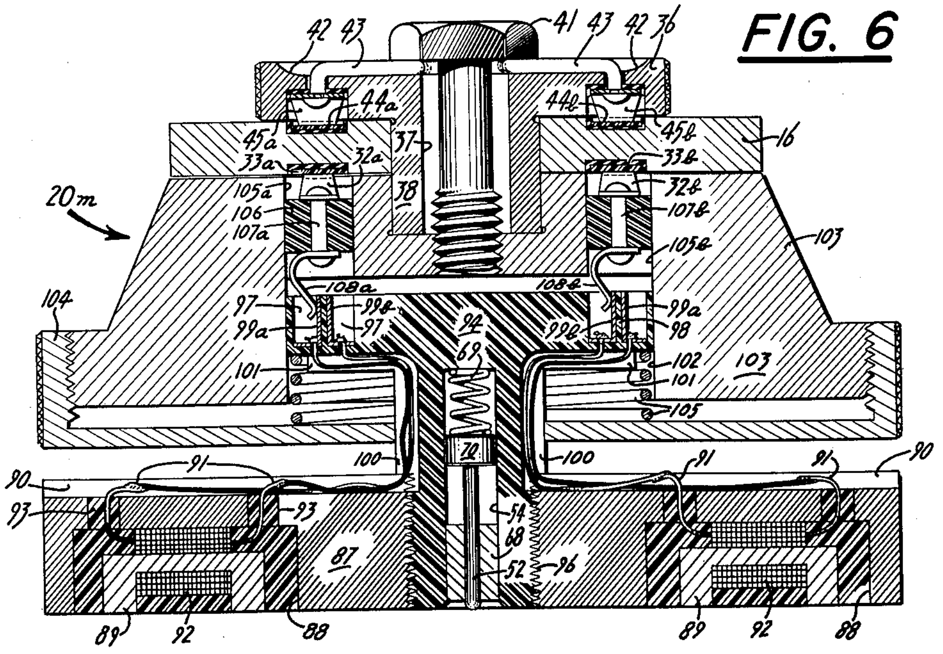

FIG. 6 is an enlarged elevation cross section of a magnetic embodiment of the stylus assembly.

Figure 7:
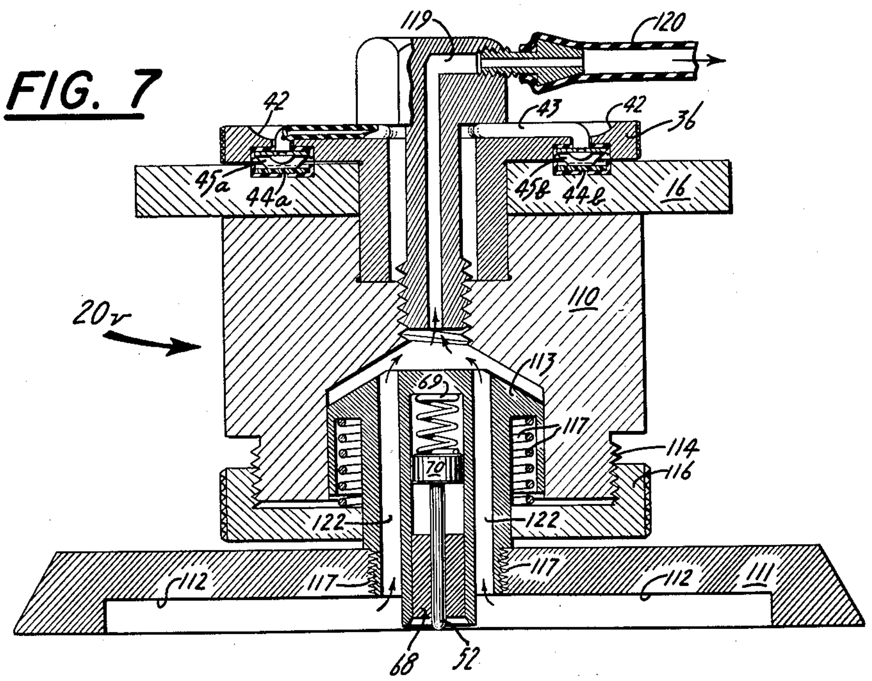

FIG. 7 is an enlarged elevation cross section of a vacuum actuated embodiment of the stylus assembly.

Figures 3, 4, 5A, 5B, 5C, 8:
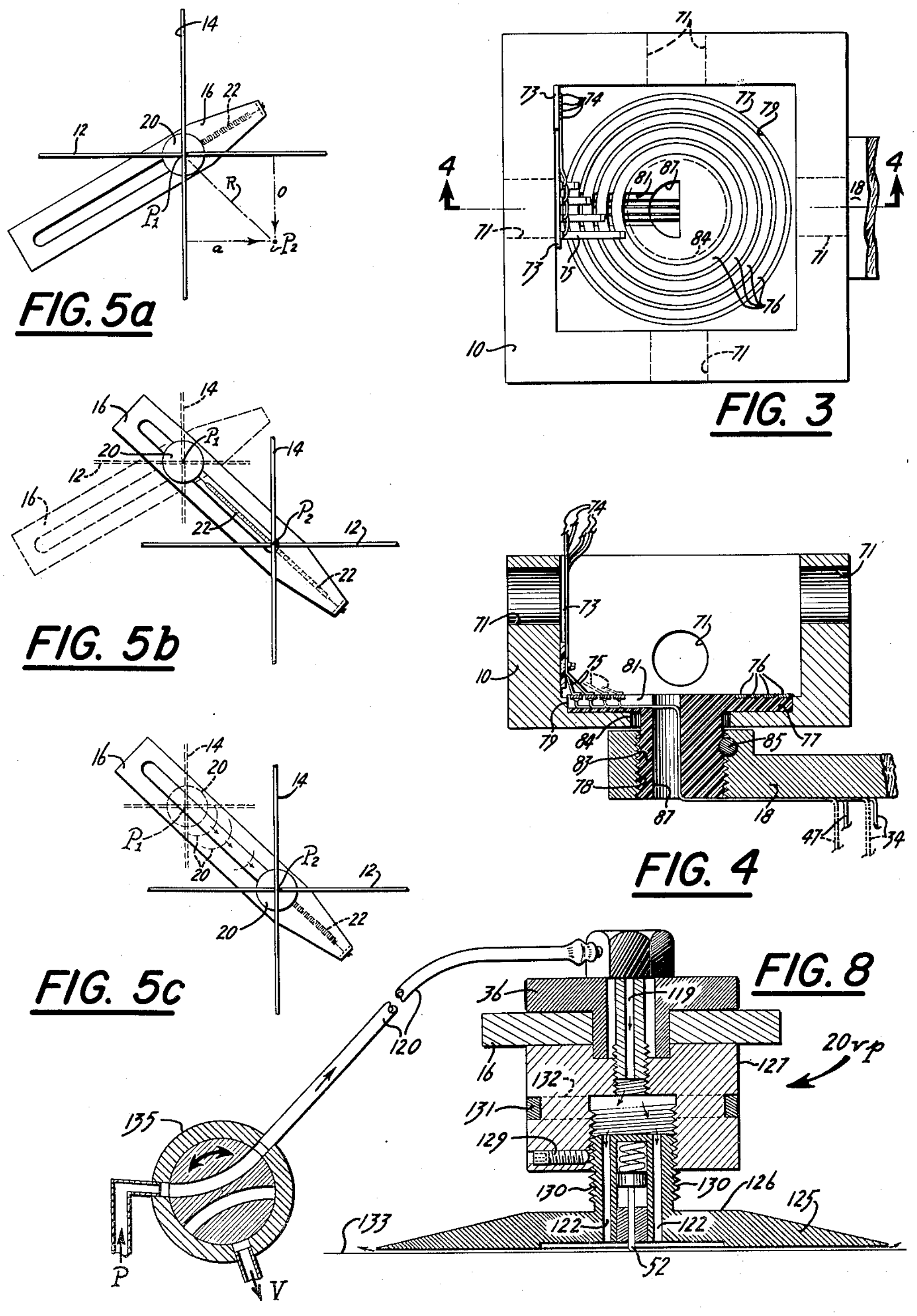
FIG. 3 is a plan view of the crosshead of FIG. 1.
FIG. 4 is a centerline elevation cross section of the crosshead of FIG. 1 taken along line 4—4 of FIG. 3.

FIG. 8 is an enlarged elevation cross section of a vacuum actuated embodiment of the stylus assembly wherein an air bearing is provided to bias the stylus assembly away from the plotting surface as the assembly travels along its guide track.

Figure 1:
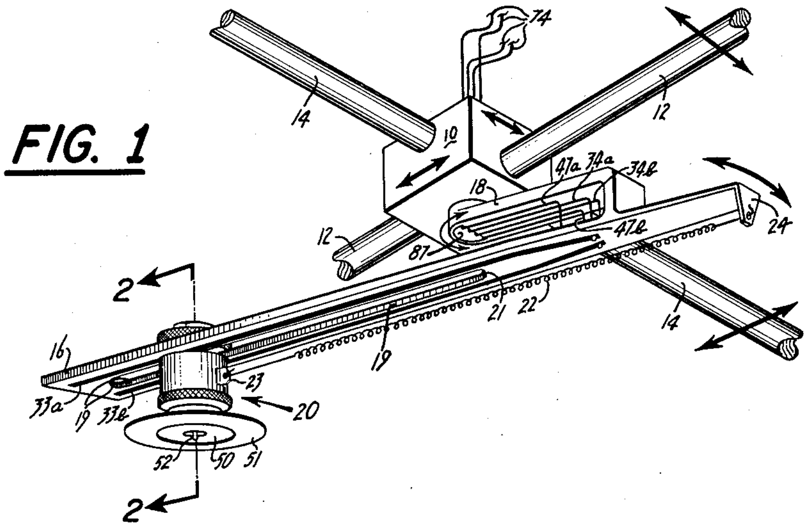
FIG. 1 is a perspective view of the invention as viewed from below.

Referring to FIG. 1, there is provided a crosshead 10 which rides on a pair of perpendicular rods 12 and 14. Both rods 12 and 14 pass through crosshead 10 so that orthogonal movements applied thereto will position crosshead 10 with respect to a plotting surface underneath (not shown.) It is to be understood, of course, that rods 12 and 14 can be disposed at angles other than 90° and still effectively position crosshead 10. However, maximum efficiency is achieved at 90° and is therefore preferred. An arm 16, with a crank extension 18 integral therewith, is pivotally mounted to the underside of crosshead 10, best shown in FIGS. 3 and 4, described in detail below. Arm 16 is provided with a slotted track 19 along which a stylus assembly, generally designated by the numeral 20, is free to travel. The inner extremity 21 of track 19 is located directly beneath the intersection of rods 12 and 14. A coil spring 22, connected between a depending lip 24 of arm 16 and a padeye 23 welded to assembly 20, provide a constant urging of bias tending to position assembly 20 toward extremity 21.

Figure 2:
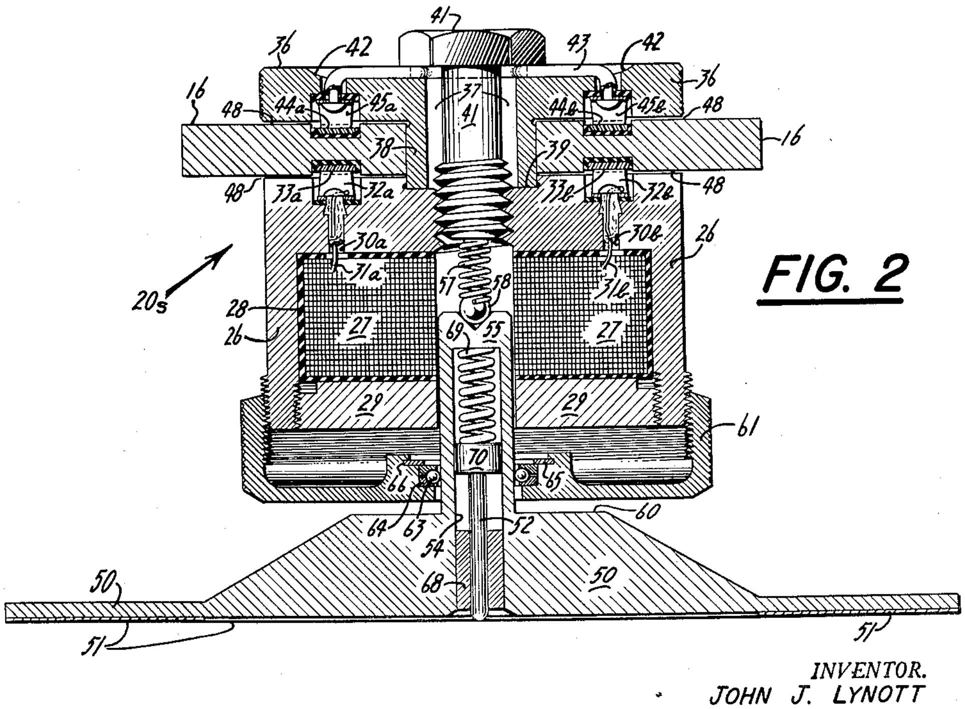
FIG. 2 is an enlarged elevation view of one embodiment of the stylus assembly of FIG. 1 taken along line 2—2 of FIG. 1.

In FIG. 2 is shown a solenoid operated embodiment **20*s* of assembly 20. It is comprised of a solenoid housing 26 having a coil 27 therein embedded in a layer of insulating material 28. Coil 27 is retained within housing 26 by a cap 29 screwed into the bottom of housing 26. Housing 26 is provided with two holes 30*a* and 30*b* for receiving leads 31*a* and 31*b* from coil 27. Each of leads 31*a* and 31*b* is soldered to an insulated brush 32*a* and 32*b* of resilient material. Brushes 32*a* and 32*b* ride on insulated conductive tracks 33*a* and 33*b*, bonded to the underside of arm 26, which connect to wires 34*a* and 34*b* (shown in FIG. 1) to control coil 27**.

Housing 26 is slidably supported from arm 16 by a cover plate 36, having a squared boss portion 38 integral therewith, through which a hole 37 has been drilled. Boss 38 rests on a shoulder 39 in housing 26 and thereby correctly spaces plate 36 from housing 26 so as to provide an appropriate sliding clearance 48 for arm 16. Boss 38 also appropriately clears the sliding surface of track 19. A threaded stud 41 extends through hole 37 and is screwed into the top of housing 26 until boss 38 contacts shoulder 39.

To measure the displacement of assembly 20 with respect to extremity 21, an insulated conductor 43, bent around stud 41 and hole 37, is located in a grooved portion 52 in the top of plate 36. Conductor 43 connects a pair of insulated conductive tracks **44*a* and 44*b* on arm 16 via resilient brushes 45*a* and 45*b* which are similar to brushes 32*a* and 32*b*. Leads 47*a* and 47*b* are connected to tracks 44*a* and 44*b*, respectively. Tracks 44a and 44b are made from any suitable material which will provide a uniform resistance therealong, such as the conductive plastics of U.S. Letters Patent 2,761,849 and 2,761,854. Thus, the farther assembly 20 is displaced from extremity 21, the greater will be the length, and hence the resistance, of the electrical path from lead 47a via track 44a, brush 45a, conductor 43**, brush 45b, track 44b and lead 47b.

A shoe of soft iron, provided with an annular skid resistant friction pad 51 bonded to its underside, carries a stylus 52, such as a graphite pencil lead, in a cylindrical recess 54 formed in an armature extension 55 of shoe 50. Extension 55 extends into coil 27 and is of a magnetic material so that energizing coil 27 will retract shoe 50 upwardly. Normally, however, shoe 50 and housing 26 are urged apart between arm 16 and a plotting surface (not shown) beneath shoe 50. This is effected by a spring 57 positioned between the end of stud 41 and a ball 58 which rests in a depression 59 formed in the top of extension 55, thereby holding assembly 20s firmly to the plotting surface underneath as arm 16 is directionally positioned by crosshead 10. It is to be noted that the absence of any rigid connection between shoe 50 and housing 26 permits housing 26 to turn freely with arm 16 and spring 22 while shoe 50 remains anchored against a plotting surface. The amount of retraction of shoe 50 is adjustably limited to the distance between the shoulder 60 of shoe 50 and the bottom of an adjustable housing cover 61 screwed onto the bottom of housing 26. Cover 61 is provided with bearings 63 in a race 64 held in place by a spring-fit retaining ring 65 in a notch 66.

A guide collar 68 for holding and guiding stylus 52 is press fitted into recess 54. As stylus 52 wears down through use, it is continually fed downwardly against the plotting surface by a spring 69 interposed between the top of recess 54 and a cylindrical block 70.

Referring to FIGS. 3 and 4, the pivotal mounting of extension 18 of arm 16 to crosshead 10 is more clearly shown, including a means for electrically connecting wires 34 and leads 47 to a power source (not shown). It is to be understood that electrical connection to coil 27 should be made through crosshead 10 to avoid the possibility of entangling the connecting wires during movements of assembly 20 and arm 16 with respect to rods 12 and 14. Therefore, the interior of crosshead 10 is generally hollow and provided with four holes 71, one being in each side wall of crosshead 10, arranged in two pairs for slidably mounting crosshead 10 on rods 12 and 14, respectively. An insulating piece 73 in the shape of a reversed L is secured to one wall of crosshead 10. Four conductors 74, fixed to piece 73, lead to four brushes 75 secured thereto. Each of brushes 75 contacts an associated one of four concentric slip rings 76 which are themselves soldered to wires 34a, 34b and leads 47a, 47b, respectively. Rings 76 are supported by the flange 77 of a slip ring support member 78 made of a suitable insulating material. Flange 77 of member 78 rests in a circular recessed bearing surface 79. A radial groove 81 is cut in flange 77 to accommodate wires 34 and leads 47, as well as to accommodate the deposit of solder required for connecting each of them to their respective slip rings 76. The lead 47 and the wire 34 which have been cut away in FIG. 4, as well as their associated brushes 75, have been shown therein in dotted lines for clarity. Member 78 is provided with a threaded shank 83 which extends through a hole 84 in the bottom of crosshead 10 and into corresponding threads in extension 18. Extension 18 and member 78 are locked together by lock pin 85 to prevent them from unscrewing during use. Shank 83 is provided with a semi-circular hole 87 cut lengthwise therethrough for passing wires 34 and leads 47 to the underside of crosshead 10 along extension 18 and subsequently to tracks 33 and 44, respectively.

Thus, arm 16 is free to rotate with respect to crosshead 10 without entangling the electrical control connections among rods 12 and 14.

The operation of this invention may best be understood by referring to FIGS. 5a, 5b and 5c using an example. Assume that it is desired to plot and connect a point $P_2$ to the next preceding plotting point $P_1$, $P_2$ being defined by abscissa *a* and ordinate *o* using $P_1$ as the origin of $P_2$. The connecting straight line is therefore represented by radius vector R.

Assembly 20s is initially held at point $P_1$ by the urging of spring 57 which spreads housing 26 and shoe 50 apart. In the subsequent embodiments, other suitable holding means perform this initial function, and are described in detail below. Orthogonal instructions represented by *o* and *a* are applied to rods 12 and 14 respectively to drive rod 12 down and rod 14 to the right until the rods intersect at poin $P_2$. Since housing 26 is free to rotate with respect to shoe 50, and arm 16 is free to pivot in crosshead 10, arm 16 swings around and points in the direction of $P_2$ as soon as rods 12 and 14 move toward their new location. After rods 12 and 14 have arrived at $P_2$, the resistance of tracks 44a and 44b can be measured by suitable circuitry to determine the length of radius vector R connecting $P_1$ and $P_2$. Energizing coil 27 via tracks 33a and 33b retracts shoe 50 by solenoid action and releases assembly 20, thereby allowing spring 22 to propel it to $P_2$, causing stylus 52 which is biased against the surface to describe a connecting line on the plotting surface between these two points, $P_1$ and $P_2$.

Referring to FIG. 6 of the drawings, another embodiment 20m of assembly 20 of the invention is there shown having means for magnetically holding such an assembly 20 to a plotting sheet. The magnetic embodiment 20m of FIG. 6 is comprised of a circular shoe 87 having two cups 88 formed in its underside to receive one of a pair of electromagnets 89 in each cup 88. In the upper surface of shoe 87 there is cut a pair of radial grooves 90 for recessing insulated leads 91 of the coils 92 of magnets 89. To provide a channel for leads 91 from each magnet 89, two pairs of holes 93 have been drilled in shoe 87 to connect each groove 90 with one of cups 88. Magnets 89 and their associated coils 92 are embedded in an insulating plastic. Shoe 87 is threadedly connected to the stem of a shoe support member 94 by lock threads 96. Support member 94 is made of an insulating material and carries the same spring-loaded stylus arrangement as shown in embodiment 20s of FIG 2. The upper or flange portion of support member 94 is circular in shape and has a pair of concentric channels 97 formed therein. Channels 97 are spaced sufficiently far apart to provide a circular slip ring support spacer portion 98 therebetween for mounting a slip ring 99 on each side thereof. Slip rings 99 provide parallel operation of electromagnets 89, one lead 91 from each coil 92 being connected to slip ring 99a via axial grooves 100 and radial grooves 101 cut in the stem and underside of the flange portion respectively of member 94. The other lead 91 from each coil 92 is similarly connected to slip ring 99b.

Support member 94 is slidably received in a cylindrical hole 102 in the bottom of a housing 103 and is retained therein by an adjustable retaining ring 104 screwed to the bottom of housing 103. Interposed between the underside of the flange portion of support member 94 and ring 104 is a spring 105 which biases support member 94 (and shoe 87) upwardly toward housing 103. Upward movement of shoe 87 is adjustably limited by ring 104 so as to provide the optimum clearance between shoe 87 and a plotting surface underneath. As in assembly 20s, there is no rigid connection between shoe 87 and housing 103 in order to allow housing 103 and arm 16 to pivot with respect to shoe 87 when anchored. This prevents shoe 87 from twisting the plotting sheet therebeneath.

In the upper portion of housing 103 there are two drilled holes 105 having therein a plug 106 of suitable insulating material. Double-headed rivots 107 extend through plugs 106 to connect brushes 32*a* and 32*b* to a pair of lower brushes 108*a* and 108*b*. The means for measuring the displacement of assembly 20 with respect to crosshead 10 in the magnetic embodiment 20*m* of FIG. 6 is the same as in the solenoid embodiment 20*s* of FIG. 2 and therefore is not described. Similarly, a padeye (not shown in FIG. 6) such as padeye 23 is welded to housing 103 for connecting assembly 20*m* to spring 22.

To utilize assembly 20*m*, a plotting sheet, such as paper, is arranged to overlay a surface (not shown) of suitable magnetic material, such as soft iron or steel. Energizing wires 34, therefore, will cause assembly 20*m* to adhere to the magnetic surface (not shown) beneath the plotting sheet (not shown) by completing an electrical circuit leading from wire 34*a* (FIG. 1) to track 33*a*, brush 32*a*, rivet 107*a*, brush 108*a*, slip ring 99*a*, and then in parallel via leads 91 to coils 92 of both magnets 89, and returning to wire 34*b* via leads 91, slip ring 99*b*, brush 108*b*, rivet 107*b*, brush 32*b*, and track 33*b*.

Thus, it can be seen that the operation of the invention as described with respect to FIGS. 5*a*, 5*b* and 5*c* above using the solenoid embodiment 20*s* may be performed by the magnetic embodiment 20*m* of FIG. 6, although shoe 87 of assembly 20*m* is spring biased oppositely from shoe 50 of assembly 20*s*, i.e., shoe 87 is biased away from the plotting surface rather than toward the plotting surface. In assembly 20*s* anchoring to the plotting surface is effected by the outward urging of spring 57 tending to spread shoe 50 and housing 26 apart, whereas in assembly 20*m* anchoring to the plotting surface is effected by energizing electromagnets 89. As was true in assembly 20*s*, assembly 20*m* is arranged with no fixed connection between shoe 87 and housing 103 thereby leaving housing 103 free to turn with arm 16 without twisting shoe 87 on the plotting sheet.

In FIGS. 7 and 8 are shown two vacuum actuated embodiments of assembly 20 of FIG. 1. Both of these embodiments 20*v* and 20*vp* incorporate means for providing a suction beneath a shoe portion thereof to anchor them to a plotting surface; however, the chief distinction between these two embodiments resides in the fact that assembly 20*vp* is arranged to provide an air bearing beneath the shoe during the time assembly 20*vp* is in transit along track 19 subsequent to its having been released from the plotting surface, whereas in assembly 20*v* its shoe portion is retracted by the action of a spring.

Referring now in detail to FIG. 7, the embodiment 20*v* there shown is comprised of a housing 110, a shoe 111 having a shallow cylindrical recess 112 formed in its underside. Shoe 111 is slidably supported in housing 110 by a support member 113. The lower portion of housing 110 is provided with threads 114 thereon for receiving a retaining cap 116. Member 113 is screwed and locked into shoe 111 by lock threads 117. A stylus assembly as described above with respect to assembly 20*s* is arranged in member 113. Shoe 111 is spring-loaded into housing 110 by a spring 117 interposed between cap 116 and member 113; therefore, the amount of the retraction of shoe 111 with respect to a plotting surface underneath may be governed by adjusting cap 116. Housing 110 is supported from arm 16 in the same manner as housing 26 of assembly 20*s* and therefore will not be described here. However, in assembly 20*v* the stud which holds housing 110 to cap 36 is provided with an axial hole 119 for passing air therethrough. A flexible hose 120 is connected to the upper end of hole 119 and leads to a low pressure source of air. A number of channels 122 (two of which are shown) are drilled longitudinally of member 113 to provide an air connection between hose 120 and recess 112. Thus, by providing a suction via hose 120, hole 119, channels 120, and recess 112, assembly 20*v* may be held firmly against a plotting surface therebeneath. Neutralization of this suction by any suitable means effectively releases assembly 20*v* permitting spring 117 to retract shoe 111 and allow stylus 52 to travel along track 19 toward extremity 21.

Referring in detail to FIG. 8, the vacuum actuated embodiment there shown is provided with a shoe 125 having a very shallow cylindrical recess 126 centrally therein. Shoe 125 is screwed into the bottom of a housing 127 and made substantially integral therewith by tightening a set screw 129 upon its threads 130. A split ring 131 encircles housing 127 in a groove 132 therein and is arranged to turn with respect to housing 127. A padeye (not shown) is welded to ring 131 for connection to the end of spring 22 so that as arm 16 changes direction ring 131 will follow without causing housing 127 and shoe 125 to turn therewith. The upper surface of a plotting sheet is represented by the line 133 and, as shown in FIG. 8, assembly 20*vp* is biased away therefrom against the limited resilience normally found in a cantilevered support, such as arm 16, by a thin film of air providing an air bearing beneath shoe 125. This air is supplied from a pressure source P through a valve 135 connected to hose 120 which leads to hole 119 and channels 122 which exhaust into recess 126. Assembly 20*vp* is anchored to surface 133 by reversing valve 135 to connect hose 120 to a vacuum source V. Although assembly 20*vp* rides on an air bearing as it travels track 19 toward extremity 21, stylus 52, being constantly in contact with surface 133, prevents assembly 20*vp* from describing an erratic path. The means for measuring displacement of assembly 20 shown in 20*s*, 20*m* and 20*v* may also be incorporated in 20*vp*.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A recording device comprising means for marking a plotting surface, a positionable member carrying said marking means, said member being positionable along a plurality of axes with respect to said marking means, holding means coupled to said marking means to prevent movement of said marking means with respect to said surface during positioning of said member, and biasing means connected between said marking means and said member for urging the marking means toward said members upon release of said holding means.

2. A recording device comprising means for marking a line on a plotting surface, a positionable member carrying said marking means, said member being positionable along a plurality of axes in a single plane with respect to said marking means, holding means coupled to said marking means to prevent movement of said marking means with respect to said surface during positioning of said member, and elastic biasing means connected between the marking means and the member to move said marking means toward said member upon release of said holding means, whereby said marking means describes a line on said surface as it moves.

3. A recording device comprising means for marking a line on a plotting surface, a positionable member carrying said marking means, said member being positionable along a plurality of axes in a single plane with respect to said marking means, suction means selectively operable and coupled to said marking means for preventing movement of said marking means relative to said surface during positioning of said member, and biasing means interposed between said marking means and said member and arranged to move said marking means toward said member upon deactivation of said suction means, whereby said marking means describes a line on said surface as it moves.

4. A recording device comprising means for marking a line on a plotting sheet, a magnetic surface underlying said sheet, a positionable member supporting said marking means, said member being positionable along a plurality elastic biasing means operatively coupled to said marking means, said marking means including an electromagnet for preventing movement of said marking means relative to said surface during positioning of said member, and elastic biaing means operatively coupled to said marking means and the positionable member to move said marking means toward said member upon release of said electromagnet, whereby said marking means describes a line on said sheet as it moves.

5. A recording device comprising means for marking a line on a plotting surface, a positionable member supporting said marking means, said member being displaceable with respect to said marking means, means operatively interposed between said members and said marking means for electrically indicating the degree of said displacement, said member being positionable along a plurality of axes with respect to said marking means, holding means connected to the marking means for preventing movement of said marking means with respect to said surface during positioning of said member, and elastic biasing means coupled to said marking means and arranged to move said marking means toward said member upon release of said holding means, whereby said marking means describes a line on said surface as it moves.

6. A plotting device comprising means for marking a line on a plotting surface, said marking means being biased continually against said surface, a positioning member supporting said marking means, said member being displaceable along a plurality of axes with respect to said marking means, electrical means connected between said marking means and said member for indicating the degree of displacement of said member with respect to said marking means, means for laterally holding said marking means with respect to said surface during positioning of said member, and biasing means coupling said marking means and said member to move said marking means toward said member upon release of said holding means, whereby said marking means describes a line on said surface as it moves.

7. A plotting device comprising means for marking a plotting surface, means for holding said marking means laterally with respect to said surface, a positionable member supporting said marking means, said member being displaceable with respect to said marking means, said member being positionable in a plurality of axes, biasing means operatively coupled to said marking means to control said marking means upon release of said holding means, and means for indicating the degree of displacement of said member with respect to said marking means, said indicating means comprising a variable resistor having a resistance member and a wiper, said resistance member being secured to said positionable member and said wiper being secured to said marking means, whereby the resistance of said resistor varies in a predetermined direction responsive to said displacement of said member with respect to said marking means.

8. A plotting device for plotting and connecting a series of discrete points on a plotting surface comprising a crosshead member positionable along a plurality of axes, a support arm pivotally mounted from said crosshead member, said arm having a track longitudinally therealong, a marking assembly guided by said track and supported by said arm, said assembly including a stylus continually urged against said surface, a spring coupling said assembly to said arm to provide a bias to said assembly along said track in the direction of said pivot, said assembly including means for urging said arm away from said surface to hold said assembly at a first location on said surface during positioning of said crosshead member to a second location on said surface, and an electrical coil coupled to said urging means for overcoming said urging means to release said assembly, thereby allowing said spring to drive said assembly along said track, whereby said stylus marks a line on said surface from said first location to said second location.

9. A plotting device for plotting and connecting a series of discrete points on a plotting surface comprising a crosshead member positionable along a plurality of axes, a support arm pivotally mounted from said crosshead member, said arm having a track longitudinally therealong, a marking assembly guided by said track and supported by said arm, said assembly including a stylus continually urged against said surface, a spring coupling said assembly to said arm to provide a bias to said assembly along said track in the direction of said pivot, said assembly including a shoe portion normally urged into contact with said surface and away from said arm to hold said assembly at a first location on said surface during positioning of said crosshead member to a second location on said surface, said shoe portion having a magnetic part, and a coil encircling said magnetic part for retracting said shoe portion from said surface to release said assembly thereby allowing said spring to drive said assembly along said track, whereby said stylus marks a line on said surface from said first location to said second location.

10. A plotting device for plotting and connecting a series of discrete points on a plotting surface comprising a crosshead member positionable along a plurality of axes, a support arm pivotally mounted from said crosshead member, said arm having a track longitudinally therealong, a marking assembly slidably supported in said track and displaceable therealong, means for indicating the degree of displacement of said marking assembly along said track, said indicating means comprising a variable resistor having a resistance member and a wiper, said resistance member being secured to said arm and said wiper being secured to said marking assembly such that the resistance of said resistor varies in a predetermined direction responsive to displacement of said marking assembly along said track, said assembly including a stylus continually urged against said surface, a spring coupling said assembly to said arm to provide a bias to said assembly along said track in the direction of said pivot, said assembly including a shoe portion normally urged into contact with said surface and away from said arm to hold said assembly at a first location on said surface during positioning of said crosshead member to a second location on said surface, said shoe portion having a magnetic part, and a coil encircling said magnetic part for retracting said shoe portion from said surface to release said assembly, thereby allowing said spring to drive said assembly along said track, whereby said stylus marks a line on said surface from said first location to said second location, and said indicating means provides an analog indication of the degree of displacement of said marking assembly along said track.

11. A plotting device comprising a marking assembly for marking a plotting surface, a positionable member supporting said assembly, said member being positionable in a plurality of axes with respect to said marking assembly in a single plane, said assembly including a stylus biased against said surface, a shoe portion, means for biasing said shoe portion away from said surface, holding means included with said assembly for preventing movement of said marking assembly relative to said surface during displacement of said member with respect to said assembly, and biasing means acting upon said assembly to urge said assembly toward said member upon release of said holding means whereby said stylus describes a line on said plotting surface as it moves.

12. A plotting device comprising a marking assembly for marking a plotting surface, a positionable member supporting said assembly, said member being positionable in a plurality of axes with respect to said marking assembly, said assembly including a stylus biased against said surface, a shoe portion, means for supplying air under pressure between said shoe portion and said surface to bias said shoe portion away from said surface, a controlled fluid channel terminating in said shoe portion for controllably providing a suction between said shoe portion and said surface to hold said marking assembly to said surface during displacement of said member with respect to said assembly, biasing means coupled between said member and said assembly to urge said assembly toward said member upon release of said suction, and means operatively associated with both said assembly and said member for indicating the degree of displacement of said assembly with respect to said member, whereby said stylus describes a line on said plotting surface as it moves.

13. A plotting device comprising a marking assembly for marking a plotting surface, a positionable member supporting said assembly, said member being displaceable with respect to said assembly, said member being positionable in a plurality of axes, said assembly including a stylus biased against said surface, a shoe portion, means for supplying air under pressure between said shoe portion and said surface to bias said shoe portion away from said surface, means coupled to said assembly for controllably providing a suction between said shoe portion and said surface to hold said marking assembly to said surface during displacement of said member with respect to said assembly, biasing means coupled to said assembly and said member to control said assembly upon release of said suction, and means for indicating the degree of displacement of said assembly with respect to said member, said indicating means comprising a variable resistor having a wiper and a resistance portion, said resistance portion being secured to said positionable member, and said wiper being secured to said assembly to vary the resistance in a predetermined direction responsive to displacement of said member relative to said assembly, whereby said stylus describes a line on said plotting surface as it moves.

14. A plotting device comprising means for marking a permeable plotting sheet, a magnetic surface underlying said sheet, said marking means including an electromagnet for holding said marking means to said surface, a positionable member supporting said marking means, said member being displaceable with respect to said marking means, said member being positionable in a plurality of axes, biasing means operatively coupled to said marking means for controlling said marking means upon release of said electromagnet, and means for indicating the degree of displacement of said member with respect to said marking means, said indicating means comprising a variable resistor having a resistance member and a wiper, said resistance member being attached to said positionable member and said wiper being attached to said marking means, whereby the resistance of said resistor varies in a predetermined direction responsive to said displacement of said positionable member with respect to said marking means.

15. A plotting device comprising means for marking a plotting surface, a support member positionable along a plurality of axes with respect to the marking means in a plane substantially parallel to the plotting surface, said marking means including means for controllably holding said marking means to said surface during positioning of said support member in said plane in a direction away from said marking means, and driving means coupled between said marking means and said support member to urge said marking means toward said member upon release of said holding means.

16. A plotting device comprising means for marking a plotting surface, a positionable member laterally displaceable along a plurality of axes with respect to said marking means and constructed to pivot about said marking means, holding means operatively coupled to said marking means for laterally holding said marking means with respect to said surface to prevent movement thereof across said surface during displacement of said member with respect to said marking means, and biasing means interposed between said marking means and said member to drive said marking means toward said member upon release of said holding means.

17. A plotting device comprising a stylus for marking a surface, a transport member movable along a plurality of axes relative to said stylus, holding means for laterally restraining said stylus with respect to said surface during movement of said transport member to laterally remove said stylus from a normal position with respect to said member, elastic means coupling said stylus to said transport member for restoring said stylus to said normal position with respect to said transport member upon release of said holding means.

18. A plotting device comprising a transport arm, a stylus for marking a surface, said stylus being supported by said arm, holding means for preventing movement of said stylus relative to said surface during movement of said arm relative to said stylus to laterally remove said stylus from a normal position with respect to said arm, elastic means coupling said stylus to said arm to restore said stylus to said normal position with respect to said arm upon release of said holding means, and means connected between said arm and said stylus for electrically indicating the degree of said movement.

19. A plotting device comprising a stylus for marking a surface, a transport member movable along a plurality of axes relative to said stylus, holding means for laterally restraining said stylus with respect to said surface during movement of said transport member to laterally remove said stylus from a normal position with respect to said member, elastic means coupling said stylus to said transport member for restoring said stylus to said normal position, and means connected between said member and said stylus for electrically indicating the degree of said movement.

References Cited in the file of this patent

UNITED STATES PATENTS

| | | |
|---|---|---|
| 837,690 | Laubunski | Dec. 4, 1906 |
| 1,310,201 | Maxim | July 15, 1919 |
| 2,562,664 | Goudsmit | July 31, 1951 |
| 2,734,272 | Brown | Feb. 14, 1956 |

UNITED STATES PATENT OFFICE

CERTIFICATE OF CORRECTION

Patent No. 3,016,612 January 16, 1962

John J. Lynott

It is hereby certified that error appears in the above numbered patent requiring correction and that the said Letters Patent should read as corrected below.

Column 7, line 9, for "elastic biasing means operatively coupled" read -- of axes in a single plane with respect --; line 13, for "biaing" read -- biasing --.

Signed and sealed this 22nd day of May 1962.

(SEAL)
Attest:

ERNEST W. SWIDER
Attesting Officer

DAVID L. LADD
Commissioner of Patents